United States Patent [19]
Oliver et al.

[11] Patent Number: 4,588,445
[45] Date of Patent: * May 13, 1986

[54] ELIMINATING DRILLING MUD SOLIDS FROM SURFACE WELL EQUIPMENT

[76] Inventors: John E. Oliver, 3752 Del Monte, Houston, Tex. 77019; Arnold M. Singer, 3042 Las Palmas, Houston, Tex. 77027

[*] Notice: The portion of the term of this patent subsequent to Jun. 12, 2001 has been disclaimed.

[21] Appl. No.: 633,797

[22] Filed: Jul. 24, 1984

Related U.S. Application Data

[63] Continuation-in-part of Ser. No. 450,519, Dec. 17, 1982, Pat. No. 4,515,699, and Ser. No. 420,140, Sep. 20, 1982, Pat. No. 4,453,598.

[51] Int. Cl.⁴ .................. B08B 9/00; E21B 21/00; 134 8; 134 22.14; 134 22.19; 134 26; 134 40; 166 312; 252 8.55 B
[52] U.S. Cl. .................. 134/22.14; 134/22.19; 134/40; 166/312
[58] Field of Search ............ 134/8, 22.14, 22.19, 134/26, 40; 166/312; 252/8.55 B

[56] References Cited

U.S. PATENT DOCUMENTS

| | | | |
|---|---|---|---|
| 2,356,254 | 8/1944 | Lehmann et al. | 134/22.19 X |
| 2,414,668 | 1/1947 | Ratcliffe | 166/312 X |
| 3,077,929 | 2/1963 | Fetkovich et al. | 134/22.14 X |
| 3,122,203 | 2/1964 | Hawkins | 166/312 X |
| 3,411,580 | 11/1968 | McKinney et al. | 166/312 X |
| 3,532,168 | 10/1970 | Webb | 166/312 X |
| 4,127,174 | 11/1978 | Sharpe et al. | 166/312 X |
| 4,453,598 | 6/1984 | Singer et al. | 166/312 |
| 4,474,240 | 10/1984 | Oliver et al. | 166/312 |

*Primary Examiner*—George Yeung
*Attorney, Agent, or Firm*—Vaden, Eickenroht, Thompson & Jamison

[57] ABSTRACT

Eliminating drilling mud and other solids from surface equipment of a well system (e.g. offshore platform) which is to receive solids-free completion and packer fluids having an affinity to entrain residual solids. These solids are mechanically removed (where possibly by scrapers, squeeging, etc.), and then the surface equipment is washed with water to carry the solids to a convenient disposal. Clean water is placed into the surface equipment and added to it are a surfactant and alcohol to produce a treated water. The treated water is circulated at turbulent (high shear) flowing conditions through the surface equipment. The treated water with entrained solids is removed to a suitable disposal by displacement with clean water whereby the surface equipment is sufficiently free of solids to avoid contamination of completion or packer fluids introduced thereinto.

8 Claims, 1 Drawing Figure

ELIMINATING DRILLING MUD SOLIDS FROM SURFACE WELL EQUIPMENT

RELATED PATENT APPLICATION

Continuation-in-part of CHEMICALLY CLEANING DRILLING/COMPLETION/PACKER BRINES; Ser. No. 450,519, filed Dec. 17, 1982, now U.S. Pat. No. 4,515,699, issued May 5, 1985, by Arnold M. Singer and John E. Oliver, Jr. and DRILLING MUD DISPLACEMENT PROCESS, Ser. No. 420,140, filed Sept. 20, 1982, now U.S. Pat. No. 4,453,598, issued June 12, 1984.

BACKGROUND OF THE INVENTION

1. Field of the Invention

This invention relates to cleaning of surface well equipment and it more particularly relates to the complete removal of drilling mud, other solid and oil, from the surface well equipment prior to introduction of the solids-free brines or other well fluids having an affinity for solids.

2. Description of the Prior Art

There are certain completion and packer fluids, e.g., high density brines, that have a great affinity for entraining solids, which solids may originate in drilling muds or from drilling operations.

Aqueous brine solutions of high density are used in wellbores employed in the production of petroleum. These solutions have been used as both drilling, completion and packer fluids especially in deep wells subject to high formation gas pressures at elevated temperatures. These brines can be formed of the sodium, calcium, zinc salts with chloride, bromide and potassium. These aqueous fluids may include corrosion inhibitors and other salts such as soda ash. The density of these salt type well fluids depends on the particular salt, or mixture of salts, and their concentration in the aqueous well fluid. Usually, these salt type well fluids have a density in the range of between about 8 and 17 pounds per gallon.

The salt type well fluid should be solids-free in its use as a well fluid. If there are solids in a packer or completion fluid, they can cause serious injury to a producing formation by plugging of the pore spaces therein or even of the perforations and channels provided to induce fluid flows between the formation and well bore. If there are solids in a packer fluid, the solids will precipitate with time upon the packer. As a result, these solid deposits make it difficult to disconnect the tubing from the packer with a resultant costly well workover.

The high density brine can be prepared at the wellsite by dissolving the prescribed amount of salt into the aqueous phase, which phase is principally fresh or sea water but it can include various inhibitors for preventing pitting, corrosion, etc. The mixture is circulated or agitated in the surface well equipment until there are no undissolved salt solids. Naturally, the problems of adding salts to be dissolved in the aqueous well fluid became progressively more severe as the density increases, both in time, manpower and equipment requirements. Importantly, the surface well equipment must be scrupulously clean of any solids, especially the solid and oil portions of drilling mud. Otherwise, the prepared brine must be filtered to remove solids until the solids content has been reduced to less than 2–3 p.p.m.

At present, vendors will deliver to the wellsite the prepared high density brine of a desired density and combination of selected ingredients. The delivery of brine usually requires several changes in containers. For example, the brine is moved from the vendor tanks to truck transport, offshore supply boat and into the rig mud system. The brine can also become contaminated in the surface well equipment by entrainment of undesired solids, including residual water wetted solids and/or oil based drilling mud, weighing agents such as barite, rust, salt, silt and sand, and other undissolved materials. Contaminating liquids such as mud bases, lubricants and diesel fuel can also be present and entrained in the brine. The brine has a great affinity to entrain solids.

In selecting proper vendors, solids-free high density brine can be delivered to the well site, especially to offshore platforms. Attempts have been made to clean surface well equipment so as to prevent contamination of this brine with drilling mud and other resident solids.

It has been a practice to clean mechanically the rig's mud system of residual drilling mud by various washing and manual clean-up techniques. For example, offshore rigs use jet streams of sea water and crewpersons with mechanical scrapers, brooms, etc. in an attempt to remove residual drilling mud constituents. This technique for cleaning thoroughly the rig's surface mud equipment is very time consuming and expensive.

The problem with removing drilling mud and other solids from surface well equipment is twofold; (1) the thixotropic mud stiffens as a gel to hold solids in the non-Newtonian state, and (2) diluting the mud with water reduces its viscosity and gel formation whereby mud and other solids readily deposit in the lower parts of flow channels and in stagnant regions of the system. Not all parts of the surface well system are exposed for cleaning as are the several mud tanks, shakers, manifolds, etc. For example, there are literally several hundred feet of interconnecting piping, valves, surge and pulsations control devices and the like that cannot be cleaned mechanically. Importantly, the pumping system includes piping of over one foot in diameter. For these reasons, simple mechanical cleaning with clean water washing cannot leave the surface mud equipment scrupulously clean so that a completion brine is not contaminated by the residual solids it entrains with great affinity. During the cleaning of the mud system, the rig must be shutdown for between 5 and 13 hours on the average. The costs of cleaning ranges from about $3000 to $8000 per hour. Thus, a fast efficient cleaning procedure would save the majority of rig down time in an amount of about $40,000.

The present improved process substantially eliminates all of the drilling mud, including solids such as barite, bentonite, cement, etc. and oil materials, from the surface well equipment prior to entry therein of the solids-free completion and packer brine. As a result, the brine remains substantially free of solids before pumped into the well bore. If brine filtration is needed, the filter loading remains very small and does not involve any significant expense in rig time. The overall rig down time to practice the present process requires only two-to-three hours. This is an important advantage in offshore drilling platforms.

SUMMARY OF THE INVENTION

In accordance with this invention, there is provided an improved process for eliminating drilling mud, other solids and oil from surface equipment in a well system prior to introduction of solids-free completion and packer fluids. The drilling mud and solids are removed mechanically from the surface equipment which is then washed with water to displace these solids to convenient disposal. Clean water is introduced into the surface equipment and a surfactant and alcohol are added to provide treated water. The treated water is circulated through all the surface equipment receiving the solids free completion and packer fluid and at turbulent flow conditions, so that substantially all residual solids are suspended therein. The treated water entrained solids are removed from the surface equipment to a suitable disposal. Clean water is then circulated through the surface equipment so that it is sufficiently free of solids to avoid contamination of any completions and packer fluid introduced thereinto.

DESCRIPTION OF THE PREFERRED EMBODIMENT

Figure 1:
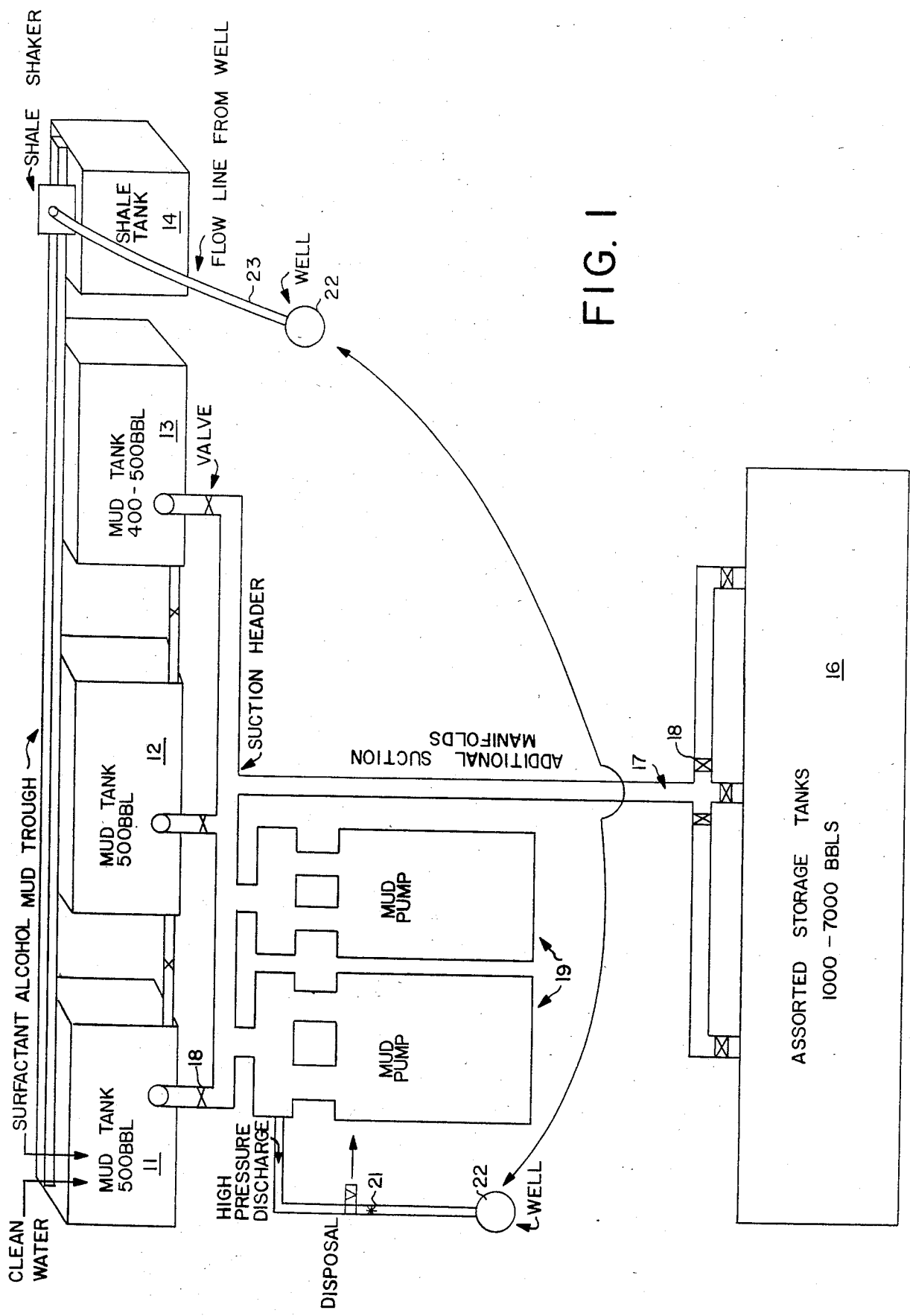
FIG. 1 is a schematic flow diagram illustrative of the surface mud equipment on a well system which includes several mud tanks, pumps, interconnecting piping and control valves.

Referring to the drawings, there is shown in a typical well system which includes surface equipment used in conjunction with a well as arranged on an offshore rig platform. The equipment can include mud tanks 11, 12 and 13, a shale shaker, solids receiving tank 14, and assorted mud storage tank 16. The tanks 11–14 may be of about 500 bbl. capacity while the tank 16 is much larger, e.g., 1000–7000 bbls. The tanks are interconnected by manifold piping 17 with control valves 18. The piping 17 also connects the usual mud pumps 19 with the tanks and via high pressure line 21 to the well 22. A return mud line 23 connects returning mud flow from the well 22 to the shale shaker tank 14. The mud flow in the well 22 is usually downwardly in drill pipe or tubing and returns in upwardly flow in its annulus.

The drilling mud is non-Newtonian and has thixotropic properties. In its gel state, most solids remain suspended but some solids such as shale cuttings and barite can separate and settle into the lower parts of the surface equipment. Under flowing conditions, e.g., 2 fps, the mud is capable by its mass and viscosity to suspend most of these solids.

Unfortunately, in cleaning the surface equipment, not all of the mud can be removed. Circulating water into the residual mud causes a pronounced thinning of its viscosity, lowering of density and loss of the gel strength. Under these conditions, the water cannot be circulated to suspend solids at sufficient velocities in all of the surface equipment, especially the large piping at the mud pumps, and large amounts of residual solids accumulate from this operation.

If clean, solids-free brine were introduced into this surface equipment, the residual solids would quickly become entrained into it. Thus, the brine would have to be freed of solids by our process covered in U.S. application Ser. No. 450,519.

In accordance with the present improved process for the surface equipment, which is to receive the solids-free completion and packer fluids (e.g., brine) substantially all the residual solids are eliminated. For example, the desired fluid can be introduced into the clean mud tanks 11, 12 or 13 before introduction into the well 22.

The drilling mud in the surface equipment is removed as best possible to a convenient storage, such as the tank 16. Then, the accessible parts, such as tanks 11–14 are mechanically cleaned with shovels, scrapers, hoses, squeeges and other tools in conjunction with washing water so as to displace most of the solids to a convenient disposal. If water based muds are present, they can be disposed at the well site. Oil based muds should be sent to a safe pollution free disposal. At this time, even with the best cleaning practices, large residual amount of solids remain in the surface equipment, especially in the piping.

Next, clean water is introduced into the surface equipment, such as into the tank 11. The terminology clean or sea water are meant to designate water that may be fresh or salty as from the ocean but with relatively low suspended solids contents, e.g., less than 200 p.p.m.

Simultaneously, or thereafter, surfactant and alcohol are added to the clean water to produce a treated water that has great ability to remove and entrain the residual solids from the surface equipment. The treated water, a Newtonian fluid, is circulated through the surface equipment at sufficiently high velocity to produce turbulent flow conditions. Under these conditions, the residual solids are quickly and completely entrained within the circulating treated water. The treated water is best circulated at linear velocities of more than 1 fps to prevent any entrained solids from settling into the piping or other parts. Higher velocity (e.g., 200 fpm) to provide turbulent flows are much preferred to lower velocities at which incipient settling might occur.

Usually, the treated water is comprised in a chemical-to-water ratio of 4 drums (52.5 gallons each) admixed with each 500 barrels (42 gallons each) of water added in the tank 11. Each drum is comprised of a 50/50 composition of the surfactant and alcohol. As a result, the treated water has a concentration by volume each of about 1.0% of surfactant and alcohol. In most situations, the concentration of the chemicals need not be greater than 2%, and a 1% concentration usually works well.

The alcohol can be an aliphatic alcohol with between 5 and 12 carbon atoms and the surfactant is a surface active chemical aid with a molecular weight in the range of about 150 to about 500 with predominantly hydrophobic characteristics. The surfactant is selected from the group comprising aliphatic amines, amides and aliphatic amine oxides wherein the amine and amide and amine oxide have an alkyl group with between 8 and 18 carbon atoms.

In the preferred embodiment, the alcohol is 2-ethylhexanol. Other alcohols that work well include n-pentanol, n-hexanol and octanol. Usually, best results are obtained with alcohols having between 5 and 8 carbon atoms. However, the higher alcohols with between 9 and 12 carbon atoms can work well where they remain dissolved or suspended in the liquid phase during circulation of the treated water.

The alcohol 2-ethylhexanol is also known as 2 ethyl hexyl alcohol and Octyl alcohol. The chemical abstract service name is 1-hexanol, 2-ethyl. This alcohol can be obtained from sources of specialty solvents, and its slow evaporation rate and solvency make it useful in the present process.

A good source for the alcohol is the suppliers to the producers of plasticizers for vinyl resins. Obviously, the alcohol does not need to be of chemical purity but usually will be 99.0% by volume of pure alcohol with slight amounts of organic acids and aldehydes that do not interfere in this process.

The 2-ethyl hexanol can be obtained from Tenneco Chemicals Inc., and it has a relatively high COC flash point of 183° F., with a specific gravity of about 0.83 at 77° F.

The surface active chemical aid includes a surfactant, and usually includes a carrier solvent such as a small amount of an aromatic hydrocarbon, corrosion and pitting inhibitor, and other additives desired to be added to the aqueous well fluid. The surfactant should have a molecular weight in the range of about 150 to about 500 with predominant hydrophobic characteristics. The surfactant is selected from the group comprising aliphatic amines, amides and alphatic amide oxides wherein the amine amide and amide oxide have an alkyl group with between 8 and 18 carbon atoms.

Preferably, the surfactant is the amide reaction product of a fatty monobasic acid and a secondary amine and the amide product salt with a tertiary amine. More particularly, the fatty acid can be given the formula $C_NH_{2N+1}COOH$ wherein N is an integer between 12 and 18. The fatty acid can be selected from the group of oleic and dimerized oleic, linoleic, palmit oleic, palmitic, myristic, myristoleic and stearic acids. The oleic acid amide products give good results.

The secondary amines are selected from normal aliphatic amines that react with the fatty monobasic acids to form fatty amides that are generally used as nonionic emulsifiers. Good results are obtained when these amines are selected from the group consisting of diethanol amines.

One surfactant giving excellent results with 2-ethyl hexanol is a product of Witco Inc., and available under the tradename Witcamide 1017 (surfactant). This product is reported to be the amide reaction product of oleic acid and diethanol amine, and the amide product salt with triethanol amine. It has a specific gravity of 1.0 (same as water) is amber with a PMCC flash point above 200° F., and it is a product not hazardous under current Department of Labor definitions.

Various other amines can be used in this process. For example, the alkynol amines which are available under the Acquiness trademark can be used, such as Acquiness MA401A. It is understood that this amine is principally bis hydroxy ethyl cetyl amine.

Other examples of amines usable in this invention are cocoamine, octylamine, dioctylamine, decylamine and dodecylamine. Cocoamine may be generally represented by the formula $CH_3(CH_2)_{10}CH_2—NH_2$ and it is prepared from monoethenoid fatty acids derived from coconuts. The "coco" group $C_{12}H_{25}$ group is in greater amount than any other group.

The cocoamine may be a condensation product, i.e., oxalkylated cocoamine such as ethoxylated cocoamine with between 2 and 15 mols of ethylene oxide. More particularly, the condensation product is formed by subjecting cocoamine to a condensation with a plurality of mols of ethylene oxide in a manner well known in the art. In general, the condensation product of a mol of cocoamine with between 2 and 15 mols of ethylene oxide may be employed with good results. Preferably the condensation product is formed by condensing 10 mols of ethylene oxide per mol of cocoamine. Expressed on the basis of molecular weight, the ethoxylated cocoamine may have an average molecular weight between 285 and 860, but preferably, has an average molecular weight of about 645.

The circulating treated water has removed and has entrained substantially all of the residual solids from the surface equipment. The circulating water, at turbulent flow conditions, is now discharged and removed from the surface equipment to a suitable disposal.

Now, clean water is circulated through and then discharged from the surface equipment until it is substantially free of solids. At this time, the surface equipment is sufficiently solids-free to avoid contamination of completion and packer fluids having a great affinity for solids.

The use of the treated water in cleaning the surface equipment is of advantage since only small amounts of clean water are required. It has been found that the volumes of treated water and clean water used in this process are in the range of 100 to 1000 bbls. This feature is important in water scarce areas and from a waste disposal viewpoint.

From the foregoing, it will be apparent that there has been herein described an improved process for eliminating drilling mud and other solids from surface mud-handling equipment which is especially effective prior to introduction thereinto of solids free brine. Various changes and alterations may be made in the practice of this process by those skilled in the art without departing from the spirit of the invention. It is intended that such changes be included within the scope of the appended claims. The present description is intended to be illustrative and not limitative of the present invention.

What is claimed is:

1. A process for eliminating drilling mud and other solids and oil from surface equipment of a well system which is to receive solids-free completion and packer fluids having an affinity to entrain residual solids, the steps comprising:
(a) mechanically removing the drilling mud and other solids from the surface equipment and washing said surface equipment with relatively solids-free water to displace these solids from the surface equipment to a convenient disposal area or vessel;
(b) introducing clean water into the surface equipment and adding to the clean water surfactant and alcohol of at least 5 carbon atoms to produce a treated water and circulating the treated water of the Newtonian type at turbulent flowing conditions through all surface equipment receiving the solids-free completion and packer fluids whereby substantially all residual solids are suspended in said treated water; and
(c) circulating clean water through said surface equipment to remove said treated water and entrained solids from said surface eqipment to a disposal area or vessel until the surface equipment is sufficiently free of solids to avoid contamination of completion and packer fluids introduced into the surface equipment.

2. The process of claim 1 wherein the clean water is sea water or fresh water relatively free of solids.

3. The process of claim 1 wherein the treated water is circulated through the surface equipment including pumps, conduits, vessels, valving, and shale shakers.

4. The process of claim 1 wherein step (b) the surfactant and alcohol are added each in a volume of less than about 1 percent to the clean water for producing the treated water.

5. The process of claim 1 wherein the surfactant has a molecular weight in the range from about 150 to about 500 with predominate hydrophobic characteristics, and the surfactant is selected from the group consisting of aliphatic amine, amides and aliphatic amine oxides wherein the amine and amide and amine oxides have an alkyl group with between 8 and 18 carbon atoms, and the alcohol is an aliphatic alcohol with between 5 and 12 carbon atoms.

6. The process of claim 1 wherein the surfactant is bis hydroxy ethyl cetyl amine and the alcohol is 2 ethyl hexanol.

7. The process of claim 5 wherein the surfactant is the amide reaction product of an alkynol amine selected from the group consisting of diethanol amine and triethanol amine and a fatty acid selected from the group consisting of oleic, dimerized oleic, linoleic, palmitoleic, palmitic, myristic, myristoleic and stearic acids.

8. The process of claim 5 wherein said aliphatic amines are selected from the group consisting of cocoamine, octylamine, dioctylamine, decylamine and dodecylamine.

* * * * *